United States Patent [19]
Beckett

[11] Patent Number: 5,492,006
[45] Date of Patent: Feb. 20, 1996

[54] METHOD OF TESTING INTERNAL COMBUSTION ENGINE

[75] Inventor: John M. Beckett, Ann Arbor, Mich.

[73] Assignee: Bauer Associates, Inc., Ann Arbor, Mich.

[21] Appl. No.: 396,335

[22] Filed: Feb. 28, 1995

Related U.S. Application Data

[63] Continuation of Ser. No. 159,054, Nov. 29, 1993, abandoned.

[51] Int. Cl.$^6$ ............................................. G01M 15/00
[52] U.S. Cl. ........................... 73/117.2; 73/119 R; 73/115
[58] Field of Search .................................. 73/40, 40.5 R, 73/40.7, 41, 47, 49.7, 49.8, 115, 116, 117.2, 119 R, 120

[56] References Cited

U.S. PATENT DOCUMENTS

| | | | |
|---|---|---|---|
| 2,212,466 | 8/1940 | Bradford | 73/47 |
| 2,450,164 | 2/1944 | Ramsay . | |
| 2,679,753 | 6/1954 | Flamm | 73/115 |
| 3,320,801 | 11/1964 | Rhindress, Jr. . | |
| 3,798,964 | 3/1974 | Misseroni . | |
| 4,050,296 | 9/1977 | Benedict . | |
| 4,144,746 | 3/1979 | Maringer et al. . | |
| 4,277,830 | 7/1981 | Reid et al. | 73/116 |
| 4,557,349 | 12/1985 | Crump . | |
| 4,562,728 | 1/1986 | Timmerman . | |
| 4,730,484 | 3/1988 | Olschefski | 73/119 R |
| 5,261,271 | 11/1993 | Bihn et al. | 73/115 |
| 5,355,713 | 10/1994 | Scourtes et al. | 73/117.2 |

FOREIGN PATENT DOCUMENTS

| | | | |
|---|---|---|---|
| 1298576 | 3/1987 | U.S.S.R. | 73/119 R |

Primary Examiner—R. Raevis
Attorney, Agent, or Firm—Young, MacFarlane & Wood

[57] ABSTRACT

A method of testing an internal combustion engine to detect engine defects. After the engine has been assembled, the engine is cranked, gas under pressure is injected into the intake ports, and the pressures developed at the exhaust ports as the engine is cranked are noted and evaluated. The pressurized air injected into the intake ports amplifies the pressure signals developed at the exhaust ports so as to provide more accurate identification of engine defects and detect engine defects that might go undetected utilizing prior art technology.

13 Claims, 2 Drawing Sheets

METHOD OF TESTING INTERNAL COMBUSTION ENGINE

This is a continuation of application No. 08/159,054 filed on Nov. 29, 1993, now abandoned.

BACKGROUND OF THE INVENTION

This invention relates to methods of testing internal combustion engines and more particularly to methods of testing engines during the engine assembly process to detect engine defects.

In the assembly of a modern day motor vehicle including an internal combustion engine, it is imperative that the engine be quickly and efficiently tested during the assembly of the engine but prior to installation of the engine in the motor vehicle so as to identify and correct engine defects prior to installation of the engine in the vehicle.

Various apparatuses and methodologies have been proposed to perform such engine testing including, for example, a procedure whereby the engine crankshaft is rotated, various pressure and vacuum readings are taken at the intake and/or exhaust ports during the cranking operation, and the pressure/vacuum readings are evaluated in an effort to identify problems or defects in the assembled engine as indicated by abnormalities in the pressure and/or vacuum readings.

Whereas the testing method involving evaluation of noted exhaust and intake port pressures and vacuum signals is generally satisfactory, the relatively weak nature of the port signals makes them difficult to analyze with the result that major defects may be incorrectly analyzed and minor defects may be totally missed.

SUMMARY OF THE INVENTION

This invention is directed to the provision of an improved method of testing an internal combustion engine.

More specifically, this invention is directed to the provision of an improved method of testing an internal combustion engine utilizing amplified pressure signals to augment the defect identifying procedure.

The invention methodology relates to the testing of an internal combustion engine to detect engine defects where the engine is assembled to provide an intake port, an exhaust port, a cylinder, valves coacting with the intake and exhaust ports, a crankshaft, and a piston assembly including a piston reciprocally mounted in the cylinder and driving the crankshaft in response to reciprocal movement of the piston; the assembled engine is cranked; and port pressures are noted and evaluated to detect defects in the assembled engine.

According to the invention, the test is performed by injecting a gas under pressure into the intake port and noting the pressures developed at the exhaust port as the engine is cranked. This methodology amplifies the signals recorded at the exhaust port and improves the usability and accuracy of the methodology to detect defects in the assembled engine.

In the disclosed embodiment of the invention, the gas is air and the gas is injected into the intake port at a pressure of at least 6 psig.

According to a further feature of the invention, the method includes the further step of restricting the flow of gas out of the exhaust port during the test to increase the pressures at the exhaust port. This further step further enhances the ability of the invention methodology to detect engine defects.

According to a further feature of the invention, the step of noting and evaluating the pressures developed at the exhaust port comprises generating a series of pressure readings at the exhaust port corresponding to increments of engine rotation; generating a series of position pulses corresponding to increments of engine rotation; and comparing the pressure readings and the position pulses and generating a series of pressure readings correlated to increments of engine rotation. This evaluation methodology facilitates the identification of a specific defect in the engine.

According to a further feature of the invention, a pipe is provided for communication at one end with the engine exhaust port; the step of noting and evaluating the pressures developed at the engine exhaust port includes noting the pressures at a measuring location in the pipe; and the step of restricting the flow of gas out of the exhaust port comprises providing a restriction in the pipe at a location outboard of the measuring location. This specific arrangement facilitates the steps of measuring the pressures and restricting the air outflow.

In a disclosed embodiment of the invention, the engine defines a plurality of intake ports, a plurality of exhaust ports, and a plurality of cylinders; the gas is injected into the intake ports through a test manifold including outlets communicating respectively with each intake port and a common inlet; the gas is injected into the manifold inlet for passage through the manifold outlets to the intake ports of the engine; the gas comprises compressed air and is injected into the manifold inlet from a supply of shop air; an exhaust manifold is provided for coaction with the respective exhaust ports; and a valve is provided in the exhaust manifold in association with each exhaust port to selectively block the outflow of air from the respective exhaust ports.

DETAILED DESCRIPTION OF THE PREFERRED EMBODIMENT

Figure 1:
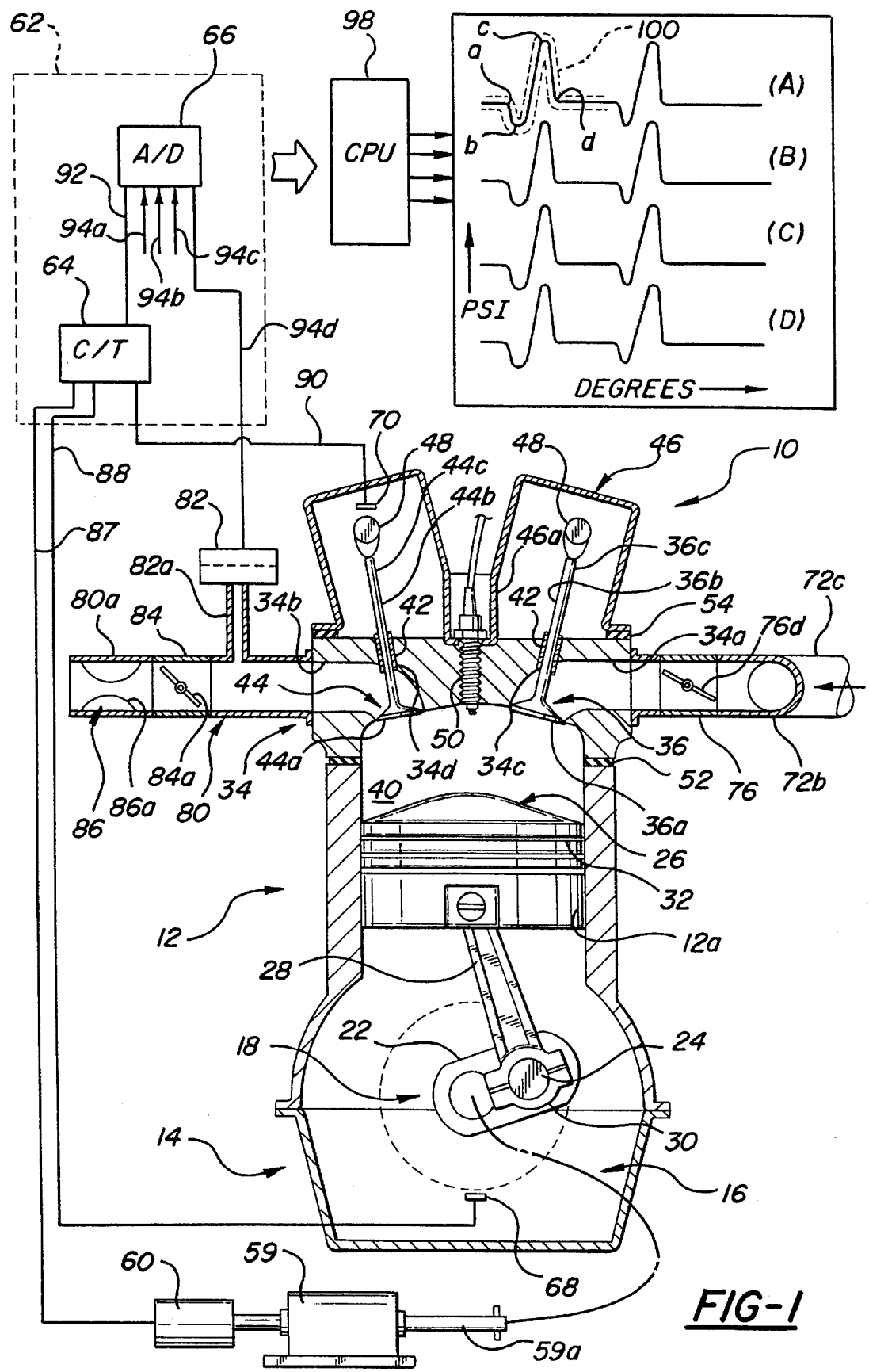
FIG. 1 is a schematic view illustrating the application of the invention methodology to the testing of an internal combustion engine.
Figure 2:
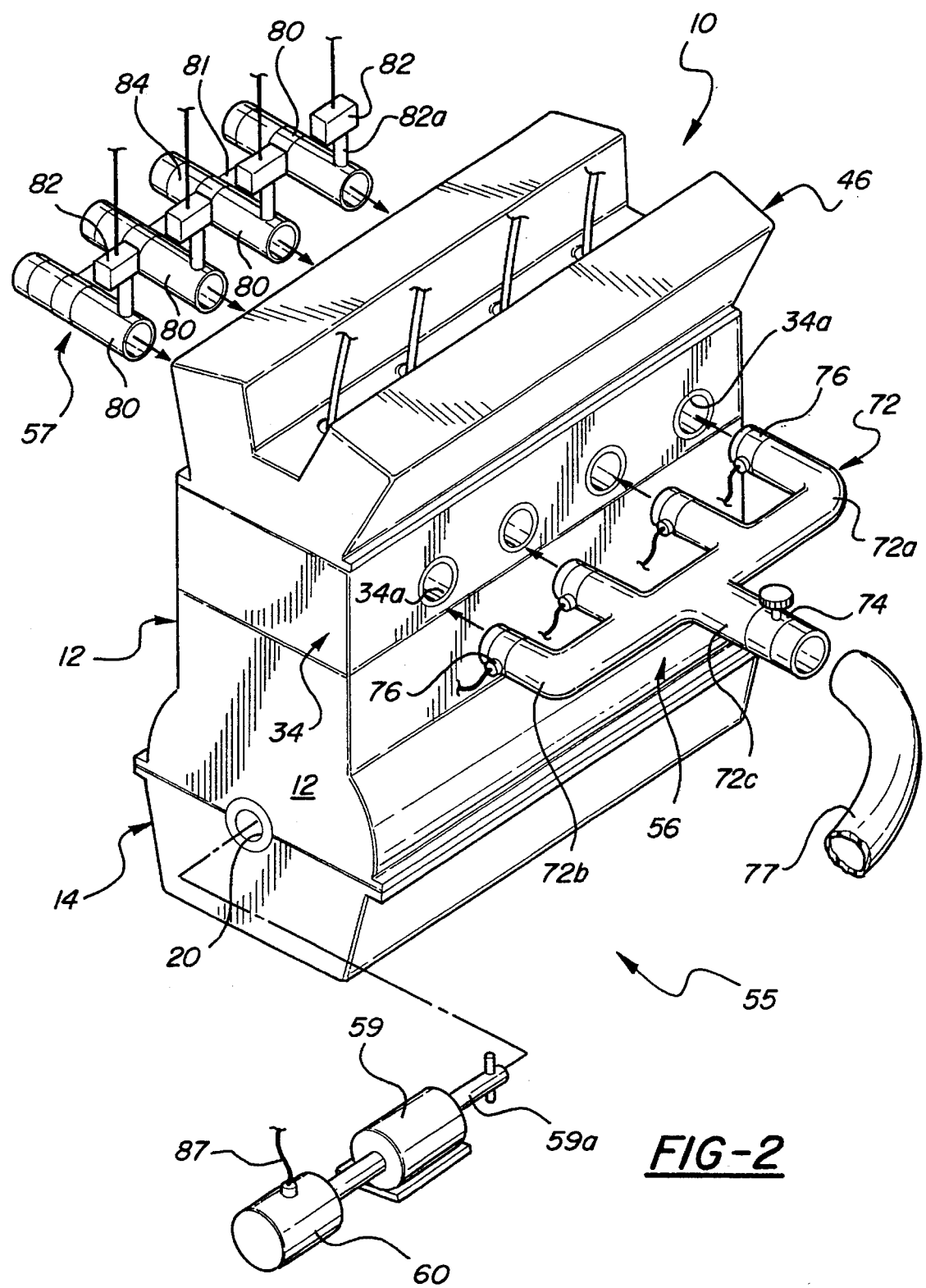
FIG. 2 is a perspective view illustrating the application of the invention methodology to the testing of an internal combustion engine.

The internal combustion engine 10 shown schematically in the drawings is of conventional design and includes a block 12 defining a plurality of cylinders 12a; an oil pan 14 secured to the lower end of the block and defining a crankcase cavity 16; a crank assembly 18 positioned in the crankcase cavity and including a crank shaft 20, a plurality of cranks 22, and a plurality of crank pins 24; a plurality of piston assemblies positioned respectively in the plurality of cylinders 12a and each including a piston 26, a connecting rod 28 pivotally mounted at its upper end to the piston 26 and secured at its lower end to a respective crank pin 24 by a rod cap 30, and a plurality of piston rings 32; a head 34 positioned on the upper end of block 12 and defining a plurality of intake ports 34a and exhaust ports 34b; an intake valve 36 for each cylinder including a valve head 36a coacting in known manner with a valve seat 34c in the head 34 to open and close inlet port 34a with respect to the combustion chamber 40 defined above the piston 32, and a stem portion 36b extending upwardly from valve head 36a and passing through a valve guide 42 and a valve stem oil seal 43 in the head 34; an exhaust valve 44 for each cylinder including a valve head 44a coacting with a valve seat 34d to selectively control communication between combustion chamber 40 and exhaust port 34b and a stem portion 44b extending upwardly from valve head 44a and passing through a valve guide 42 in head 34; a valve cover 46 positioned on top of head 34 and housing camshafts 48 driven in known manner from crank shaft 20 and coacting in known manner with the upper ends 36c, 44c of valve stems 36b, 44b to open and close the valves 36 and 44 in response to rotation of the camshafts; a plurality of spark plugs 50 positioned centrally in the head 34 and accessible through tube portions 46a of the valve cover; a head gasket 52 positioned between the upper end of block 12 and the lower end of head 34; and a cover gasket 54 positioned between the lower end of valve cover 46 and the upper end of head 34.

The invention methodology is carried out utilizing test equipment positioned at a test station 55 proximate an engine assembly line so that successive engines 10 may be brought to the test station for testing. The test equipment positioned at the test station includes an intake manifold assembly 56, an exhaust manifold assembly 57, a cranking motor 59 including a drive shaft 59a for engaging the crankshaft 20 of each engine, an encoder 60 driven by motor 59, and a computer system 62 including a counter/timer board 64 and an analog/digital converter board 66. The test equipment positioned at the test station coacts during the testing procedure with a position sensor 68 associated with the crankshaft 20 of each engine, and a position sensor 70 associated with one of the camshafts 48 of each engine. Sensors 68 and 70 are now conventionally provided with each engine to communicate with an on-board computer system built into each vehicle.

Intake manifold assembly 56 comprises a manifold 72, a pressure regulator 74, and a plurality of control valves 76.

Manifold 72 has a pipe or tubular conformation including a main body distributor portion 72a, a plurality of outlet portions or branches 72b, and a single inlet portion 72c.

Pressure regulator 74 is positioned in manifold inlet 72c so that, when inlet 72c is connected to a source of pressurized air such as a shop air hose 77, the regulator may be selectively adjusted to selectively adjust the pressure of the pressurized air delivered to the manifold for distribution through the outlet branches 72b. Although the pressure of the air introduced into the engine will vary depending upon a particular application, it has been found that the invention methodology is best facilitated by air pressure in the range of 6–15 psig.

A control valve 76 is positioned in each outlet branch 72b. Control valves 76 may, for example, comprise solenoid valves and each includes a valving member 76a movable between positions opening and closing the respective outlet branch 72b.

It will be seen that intake manifold 72 is sized to be positioned against valve head 34 with the respective outlet branches 72b positioned in alignment with the respective intake ports 34a defined in the head so that, with the manifold in place and valves 76 in an open position, air may be delivered under pressure from shop air hose 77 through the manifold to the respective intake ports 34a. It will be understood that suitable test stand fixtures, not shown, will be provided to facilitate the movement of the manifold 72 into and out of operative relationship with respect to the intake ports 34a so that the manifold assembly may be utilized successively in association with successive engine assemblies delivered to the test station 55.

Exhaust manifold assembly 57 includes a plurality of exhaust pipes 80 suitably interconnected by a clamp structure 81, a pressure transducer 82 associated with each exhaust pipe 80, a solenoid valve 84 associated with each exhaust pipe, and a restrictor 86 at the outlet end 80a of each exhaust pipe.

Pressure transducers 82, which may comprise for example strain gauge type pressure transducers employing Wheatstone bridges, are respectively connected to each exhaust pipe 80 by a tube 82a so that pressures occurring in the respective exhaust pipes 80 are sensed by the respective pressure transducers 82 and converted to electrical output signals proportioned to the magnitudes of the sensed pressures.

Each restrictor 86 serves to define a restricted orifice 86a proximate the outlet end 80a of the respective exhaust pipe to restrict the movement of pressurized air out of the exhaust pipe.

Each solenoid valve 84 is positioned in the respective exhaust pipe at a location between the respective tube 82a and the respective restrictor 86 and includes a valving member 84a movable between positions opening and closing the respective exhaust pipe.

Exhaust manifold assembly 57 is arranged to be moved into and out of operative relationship with respect to an engine 10 with the individual exhaust pipes 80 cooperating, in the operative relationship, with respective exhaust ports 34b to establish communication between the exhaust ports 34b and the manifold assembly. It will be understood that suitable test stand fixtures, not shown, will be provided to facilitate the movement of the exhaust manifold into and out of operative relationship with each successive engine 10 as the engines are brought into successive alignment with test station 55.

Encoder 60 is of known form and is operative when driven by motor 59 to generate a series of encoder pulses on a lead 87 connected to counter/timer 64.

Counter/timer board 64 receives the encoder pulses from encoder 60 on lead 87; receives approximate crankshaft position signals on a lead 88 connected to the crankshaft position sensor 68 of the test engine; and receives approximate camshaft position signals on a lead 90 connected to the camshaft position sensor 70 of the test engine. Counter/timer 64 processes the signals received on leads 87, 88, and 90 and generates a signal pulse train for transmission on a lead 92 to analog/digital board 66.

Analog/digital board 66 receives the signal pulse train from counter/timer board 64 on lead 92 and receives transducer signals from the respective pressure sensors 82 on leads 94a, 94b, 94c and 94d (assuming a four cylinder engine under test). Analog/digital board 66 compares the information received from counter/timer board 64 and the transducer signals received on leads 94a, 94b, 94c, and 94d, and generates a series of pressure readings representing the four cylinders and correlated in each case to each increment of movement of the crankshaft and the camshaft. It will be understood that the signal pulse train transmitted from counter/timer board 64 to analog/digital converter board 66 on lead 92 serves as an external trigger for the analog/digital converter board and in effect instructs the analog/digital converter board with respect to when to take readings of signals from the respective transducers.

The pressure readings from analog/digital converter board 66 are transferred via a bus to a CPU board 98.

CPU board 98 receives the pressure readings from analog/digital converter board 66 and analyzes the signals in a manner to detect defects, if any, in the various cylinders of the engine under test.

In the use of the invention methodology, as an engine 10 is transported to test station 55 utilizing suitable conveyor means, and after the engine has been halted at the test station, intake manifold assembly 56 and exhaust manifold assembly 57 are brought into operative relation with the head 34 of the engine to bring the intake manifold branches 72b into respective alignment with intake ports 34a and to bring exhaust pipes 80 into respective alignment with exhaust ports 34b; crankshaft 20 is rotated (at for example 150 revolutions per minute) utilizing motor 59 and shaft 59a so that the engine moves through successive revolutions with each two crankshaft revolutions simulating an intake, compression, power and exhaust stroke of the engine; solenoid valves 76 are opened; shop air hose 77 is connected to inlet 72c to deliver pressurized shop air through inlet manifold outlet branches 72b to the respective intake ports 34a under a pressure determined by adjustment of pressure regulator 74; the pressurized air delivered to the intake ports enters the respective cylinders of the engine during the intake stroke, is compressed during the compression stroke, expands during the power stroke, and appears during the exhaust stroke as pressurized air in the exhaust ports 34b and in the exhaust pipes 80; and the pressures experienced in the exhaust pipes are respectively sensed by the strain gauge pressure transducers 82 which operate in known manner to generate output signals on leads 94a, 94b, 94c, and 94d for transmittal to analog/converter board 66.

Simultaneously, approximate crankcase position signals are transmitted from sensor 68 on lead 88 to counter/timer converter board 64, approximate camshaft position signals from sensor 70 are transmitted on lead 90 to counter/timer converter board 64, and encoder pulses are delivered on lead 87 to counter/timer converter board 64 from encoder 60.

As previously indicated, counter/timer converter board 64 functions to compare all of the received signals and generate a signal pulse train for delivery to analog/digital converter board 66 on lead 92 to externally trigger the analog/digital converter board and instruct the analog/digital converter board with respect to when to take readings of signals from the various transducers. The number of pressure signal readings taken per engine revolution will of course vary depending upon the particular application but in a typical application, 360 readings are taken of each transducer 82 per crankshaft revolution.

Although CPU 98 actually functions to evaluate and analyze the received information in digital form, the evaluated information is depicted in FIG. 1 in analog form for clarity of illustration. Thus, as seen, a pressure versus degree of crankshaft rotation graph (A, B, C, D) is provided for each cylinder of the test engine and the shape of each graph may be analyzed to detect abnormalities in the respective cylinder so as to facilitate the location of defects in each cylinder.

Each graph comprises a plotting of a series of successive points corresponding to incremental positions of the crankshaft and each graph depicts the movement of each cylinder through the engine cycle. For example, with reference to the graph A in FIG. 1, point a on the graph corresponds to exhaust valve opening, point b represents the piston at the end of the power stroke, point c represents the piston at the end of the exhaust stroke, and point d corresponds to exhaust valve closing.

The form of the wave or graph for a properly assembled engine is of course known so that the generated waveform may be compared for each cylinder to a known proper waveform to detect abnormalities in the cylinder. This detection may consist, for example, in individual analysis of the information at each point on the graph and a comparison of each point to points on a proper graph, or may consist in the use of a standard envelope 100 to represent the normal range of values at each point in the engine cycle for a normal engine. Standard envelope 100 is superimposed over the generated graph to see if the generated graph pierces the envelope at any point as an indication of an engine abnormality. In actual use, the standard envelope may be utilized to provide an initial or gross determination of an abnormality in the engine as determined by a detected piercing of the standard envelope and the individual points on the graph may then be analyzed more carefully, with point by point comparison to standard normal waveforms, to determine the exact nature and location of the defect.

In general, the invention apparatus and methodology allows two families of tests to be performed on each engine. Specifically, a first family of tests may be performed where the solenoid valves 84 in the exhaust pipes 80 are closed so as to trap the pressurized air in the exhaust pipes. This type of testing is especially suitable for detecting defects which allow air to escape from the cylinders or from the exhaust ports. A second family of tests may be performed in which the several valves 84 are open so that the restrictors 86 function to control the rate of escape of pressurized air from the exhaust pipes. This type of testing is especially suitable for detecting defects relating to valve timing, and specifically for detecting defects relating to lash adjuster or camshaft lobe defects.

Common faults or defects that can be detected utilizing the invention methodology include missing piston rings, defective or missing head gaskets, deformations in the head casting, improper seating of the exhaust valve in the exhaust valve seats, valve stem oil leaks, loose spark plugs; and valve timing defects.

Specifically, when a piston ring is missing the peak exhaust pressure is lower than the standard envelope since more air leaks past the piston rings (blow by) when the air is compressed during the intake stroke;

when there are cuts across the head gasket between adjacent cylinders, between a cylinder and a water jacket, between a cylinder and an oil cavity, or between a cylinder and atmosphere, the peak recorded pressure is below the standard waveform;

when a head gasket is missing the peak pressure is also below the standard waveform due to leakage throughout the engine;

when the head has a casting or machining defect, the seal between the head and the block is poor causing air leakage during the compression and exhaust strokes and again resulting in a lower peak pressure as compared to the standard waveform;

when there is leakage past the exhaust valve seat, the pressure within the exhaust port cavity declines after the exhaust valve is closed at a rate in excess of the standard waveform since air is leaking past the misseated exhaust valve into the combustion chamber;

when there are valve stem oil leaks, there is a low peak pressure and a rapid decline (compared to the standard waveform) in the pressure in the exhaust cavity after the exhaust valve is closed because of the air leakage through the valve stem guide; and when a spark plug is loose, air leaks out of the combustion chamber past the threads of the spark plug with the result that the pressures developed in the exhaust cavity are below the standard waveform.

The valves 76 in the intake manifold assembly allow pressurized air to be trapped and retained in the intake manifold assembly after the intake manifold has been separated from an engine under test so as to avoid leakage of shop air.

The invention methodology will be seen to provide important advantages as compared to prior art engine testing techniques. Specifically, the increased pressure provided within the engine during the test procedure by virtue of the pressurized air injected into the intake ports amplifies the pressure signals developed in the exhaust port cavities with the result that deviations in the recorded signals from standard waveforms can be much more readily detected and with the result that engine defects that might go unnoticed utilizing the prior art engine testing techniques are noted and identified utilizing the invention procedure.

Whereas a preferred embodiment of the invention has been illustrated and described in detail it will be apparent that various changes may be made in the disclosed embodiment without departing from the scope or spirit of the invention.

For example, although the invention has been described in connection with an internal combustion engine having a single exhaust valve and a single intake valve per cylinder, it will be apparent that the invention methodology may also be utilized in association with engines having multiple intake valves and multiple exhaust valves. In carrying out the invention methodology in association with a multiple valve engine, it has been found that the invention methodology is capable of distinguishing between the several intake valves and the several exhaust valves of a given cylinder in terms of identifying a specific defect in the engine. This ability to differentiate between the several exhaust valves and the several intake valves is especially apparent utilizing the invention methodology wherein the exhaust pipe solenoid valves 84 are open so that the restrictors 86 control the rate of escape of pressurized air from the exhaust ports.

I claim:

1. A method of testing an internal combustion engine to detect engine defects wherein the engine is assembled to provide an engine housing defining a cylinder, a piston mounted for reciprocal movement in the cylinder and coacting with the engine housing to define a combustion chamber, an intake port opening in the combustion chamber, an exhaust port opening at one end in the combustion chamber and extending to a location outside of the engine housing, an intake valve coacting with the intake port; an exhaust valve positioned in the opening of the exhaust port into the combustion chamber, and a crankshaft driven in response to reciprocal movement of the piston; the assembled engine is cranked cold without the use of fuel so that no internal combustion occurs during the test; and port pressures are noted and evaluated to detect defects in the assembled engine; characterized in that:

the test is performed by delivering pressurized gas to the intake port and noting the exhaust pressures developed on the exhaust port side of the exhaust valve as the engine is cranked; and the exhaust pressures are noted with the exhaust port blocked at a location outside of the engine housing.

2. A method according to claim 1 wherein:

the gas is air.

3. A method according to claim 2 wherein:

the air is injected into the intake port at a pressure of at least 6 psig.

4. A method according to claim 1 wherein:

the engine defines a plurality of intake ports, a plurality of exhaust ports, and a plurality of cylinders;

the gas is injected into the intake ports through a test manifold including outlets communicating respectively with each intake port and a common inlet; and the gas is injected into the manifold inlet for passages through the outlets and into the intake ports.

5. A method according to claim 4 wherein:

the manifold includes a valve device between the inlet and the outlets.

6. A method according to claim 5 wherein:

the gas is injected into the manifold inlet utilizing a source of pressurized air attached to the inlet.

7. A method of testing an internal combustion engine to detect engine defects comprising the steps of:

assembling the engine to provide an engine housing defining a cylinder, a piston mounted for reciprocal movement in the cylinder and coacting with the engine housing to define a combustion chamber, an intake port opening in the combustion chamber, an exhaust port opening in the combustion chamber and extending to a location outside of the engine housing, an intake valve coacting with the intake port, an exhaust valve positioned in the opening of the exhaust port into the combustion chamber, and a crankshaft driven in response to reciprocal movement of the piston in the cylinder;

cranking the engine cold without introduction of fuel and without internal combustion to simulate the cooperative operation of the engine parts under combustion conditions;

providing a pressure regulator;

supplying pressurized gas to the pressure regulator;

supplying pressurized gas from the pressure regulator to the intake port at a predetermined pressure established by the setting of the pressure regulator; and noting and evaluating the exhaust pressures developed on the exhaust port side of the exhaust valve as the engine is cranked.

8. A method according to claim 7 wherein:

the gas is air.

9. A method according to claim 8 wherein:

the gas is injected into the intake port at a pressure of at least 6 psig.

10. A method according to claim 7 wherein the step of noting and evaluating the pressures developed at the exhaust port side of the exhaust valve comprises:

generating of pressure signal at the exhaust port;

generating a pulsetrain that is sycnchronized to the rotation of the engine such that each pulse in the pulsetrain corresponds to an increment of engine rotation; and utilizing the pulses to trigger readings of the pressure signal.

11. A method according to claim 7 wherein the method includes the further step of:

restricting the flow of gas out of the exhaust port during the test beyond the restriction normally provided by the exhaust port so as to increase the pressures at the exhaust port.

12. A method of testing an internal combustion engine to detect engine defects wherein the engine is assembled to provide an engine housing defining a cylinder, a piston mounted for reciprocal movement in the cylinder and coacting with the engine housing to define a combustion chamber, an intake port opening in the combustion chamber, an exhaust port opening at one end in the combustion chamber and extending to a location outside of the engine housing, an intake valve coacting with the intake port, an exhaust valve positioned in the opening of the exhaust port into the combustion chamber, and a crankshaft driven in response to reciprocal movement of the piston; the assembled engine is cranked; and port pressures are noted and evaluated to detect defects in the assembled engine; characterized in that:

the test is performed cold without the use of fuel so that no internal combustion occurs during the test;

the test is performed by injecting a gas under pressure into the intake port and noting the exhaust pressures developed on the exhaust port side of the exhaust valve as the engine is cranked; and the flow of gas out of the exhaust port is restricted during the test by providing a valve in association with the exhaust port which is independent of and in addition to the exhaust valve and which may be closed to totally block the exhaust port so as to increase the pressures at the exhaust port.

13. A method of testing an internal combustion engine to detect engine defects comprising the steps of:

assembling the engine to provide an engine housing defining a cylinder, a piston mounted for reciprocal movement in the cylinder and coacting with the engine housing to define a combustion chamber, an intake port opening in the combustion chamber, an exhaust port opening in the combustion chamber and extending to a location outside of the engine housing, an intake valve coacting with the intake port, an exhaust valve positioned in the opening of the exhaust port into the combustion chamber, and a crankshaft driven in response to reciprocal movement of the piston in the cylinder;

cranking the engine cold without introduction of fuel and without internal combustion to simulate the cooperative operation of the engine parts under combustion conditions;

injecting a gas under pressure into the intake port;

noting and evaluating the exhaust pressures developed on the exhaust port side of the exhaust valve as the engine is cranked by providing a pipe for communication at one end thereof with the engine exhaust port and measuring the pressures at a measuring location in the pipe; and restricting the flow of gas out of the exhaust port during the test by providing a valve in the pipe independent of and in addition to the exhaust valve which may be closed to totally block the exhaust port so as to increase the pressures at the exhaust port.

\* \* \* \* \*